United States Patent
Hsiao

(10) Patent No.: US 11,870,273 B2
(45) Date of Patent: Jan. 9, 2024

(54) WIRELESS CHARGING DEVICE

(71) Applicants: Inventec (Pudong) Technology Corporation, Shanghai (CN); INVENTEC CORPORATION, Taipei (TW)

(72) Inventor: Chi-Cheng Hsiao, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/901,984

(22) Filed: Sep. 2, 2022

(65) Prior Publication Data

US 2023/0387721 A1 Nov. 30, 2023

(30) Foreign Application Priority Data

May 26, 2022 (CN) .......................... 202210587164

(51) Int. Cl.
*H02J 50/12* (2016.01)
*H02J 50/00* (2016.01)
*H02J 7/00* (2006.01)

(52) U.S. Cl.
CPC ............ *H02J 50/12* (2016.02); *H02J 7/0042* (2013.01); *H02J 50/005* (2020.01)

(58) Field of Classification Search
CPC .......... H02J 50/00; H02J 50/005; H02J 50/12; H01F 38/14
See application file for complete search history.

(56) References Cited

U.S. PATENT DOCUMENTS

| | | | | |
|---|---|---|---|---|
| 11,050,298 | B2* | 6/2021 | Chien | H04B 5/0087 |
| 11,258,309 | B2* | 2/2022 | Hwang | H02J 50/005 |
| 2015/0326055 | A1* | 11/2015 | Koyanagi | H04B 5/0093 |
| | | | | 455/573 |
| 2015/0332826 | A1* | 11/2015 | Kurihara | H01F 5/02 |
| | | | | 307/104 |
| 2015/0349406 | A1* | 12/2015 | Jung | H05K 7/2039 |
| | | | | 343/702 |

(Continued)

FOREIGN PATENT DOCUMENTS

KR 20170053025 A * 5/2017

*Primary Examiner* — Rexford N Barnie
*Assistant Examiner* — Joseph N Inge
(74) *Attorney, Agent, or Firm* — Locke Lord LLP; Tim Tingkang Xia, Esq.

(57) ABSTRACT

A wireless charging device includes a casing, a circuit board and at least one wireless charging module. The casing includes a bottom plate and a plurality of mounting pillars protruding from the bottom plate. The circuit board includes a substrate and at least one support assembly, and the substrate is stacked on the plurality of mounting pillars. The support assembly includes a plurality of support pillars protruding from the substrate. The wireless charging module includes a mounting frame and a charging coil. The mounting frame has a plurality of first assembling parts. The plurality of first assembling parts are respectively mounted on the plurality of support pillars. The charging coil is disposed on the mounting frame. Projections of the plurality of mounting pillars on the bottom plate at least partially overlap projections of the plurality of support pillars on the bottom plate.

9 Claims, 3 Drawing Sheets

(56) References Cited

U.S. PATENT DOCUMENTS

| | | | |
|---|---|---|---|
| 2016/0143194 A1* | 5/2016 | Yanagida | H02J 50/70 |
| | | | 307/104 |
| 2017/0229889 A1* | 8/2017 | Seo | H02J 7/0044 |
| 2018/0366263 A1* | 12/2018 | Nishizaki | H01F 41/064 |
| 2020/0006949 A1* | 1/2020 | Song | H01F 17/0013 |
| 2021/0126493 A1* | 4/2021 | Cai | H02J 50/10 |
| 2022/0103012 A1* | 3/2022 | Himmer | H01F 27/025 |
| 2022/0322516 A1* | 10/2022 | Kim | H05K 1/0203 |

* cited by examiner

WIRELESS CHARGING DEVICE

CROSS-REFERENCE TO RELATED APPLICATIONS

This non-provisional application claims priority under 35 U.S.C. § 119(a) on Patent Application No(s). 202210587164.3 filed in China, on May 26, 2022, the entire contents of which are hereby incorporated by reference.

BACKGROUND OF THE INVENTION

Technical Field of the Invention

The invention relates to a charging device, more particularly to a wireless charging device.

Description of the Related Art

Nowadays, many smartphones are equipped with wireless charging modules, and with such trending, manufacturers in this industry vigorously develop wireless charging devices. A wireless charging device charges an object by using electromagnetic induction, and in order to detect foreign objects, the wireless charging device also supports wireless communication function.

However, a conventional wireless charging device is designed to be used indoors with relatively stationary environments. In an environment (e.g., in a moving car) where users may easily lose their balance, the users may unintentionally lean on or press the wireless charging device, and therefore, circuit boards in the wireless charging device may be deformed due to unintentional acts of the users, thus damaging the wireless charging device.

SUMMARY OF THE INVENTION

The invention provides a wireless charging device, which is capable of resisting unintentional external forces, thereby preventing damages to the wireless charging device.

One embodiment of the invention provides a wireless charging device includes a casing, a circuit board and at least one wireless charging module. The casing includes a bottom plate and a plurality of mounting pillars protruding from the bottom plate. The circuit board includes a substrate and at least one support assembly, and the substrate is stacked on the plurality of mounting pillars. The support assembly includes a plurality of support pillars protruding from the substrate. The wireless charging module includes a mounting frame and a charging coil. The mounting frame has a plurality of first assembling parts. The plurality of first assembling parts are respectively mounted on the plurality of support pillars. The charging coil is disposed on the mounting frame. Projections of the plurality of mounting pillars on the bottom plate at least partially overlap projections of the plurality of support pillars on the bottom plate.

According to the wireless charging device as described above, since at least some of the support pillars of the support assembly are respectively coaxially arranged with at least some of the mounting pillars of the casing, or the projections of the support pillars on the bottom plate at least partially overlap the projections of the mounting pillars on the bottom plate, external forces exerted on the top plate can be transferred to the bottom plate via the second assembling parts, the mounting pillars and the support pillars, and thus, the force exerted on the circuit board can be reduced, thereby preventing damages to the wireless charging device caused by deformation of the circuit board.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION

Figure 1:
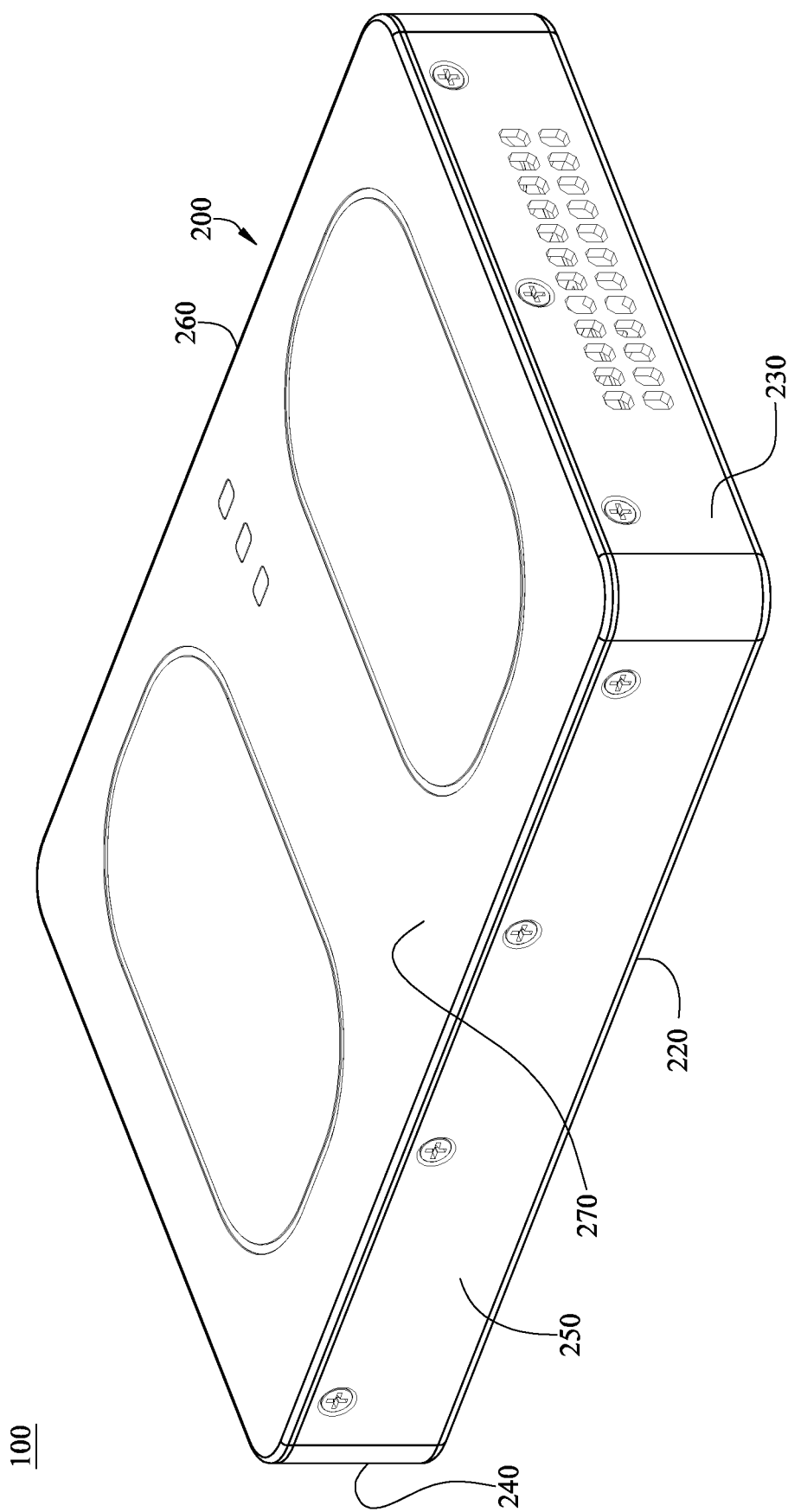
FIG. 1 is a perspective view of a wireless charging device in accordance with the first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
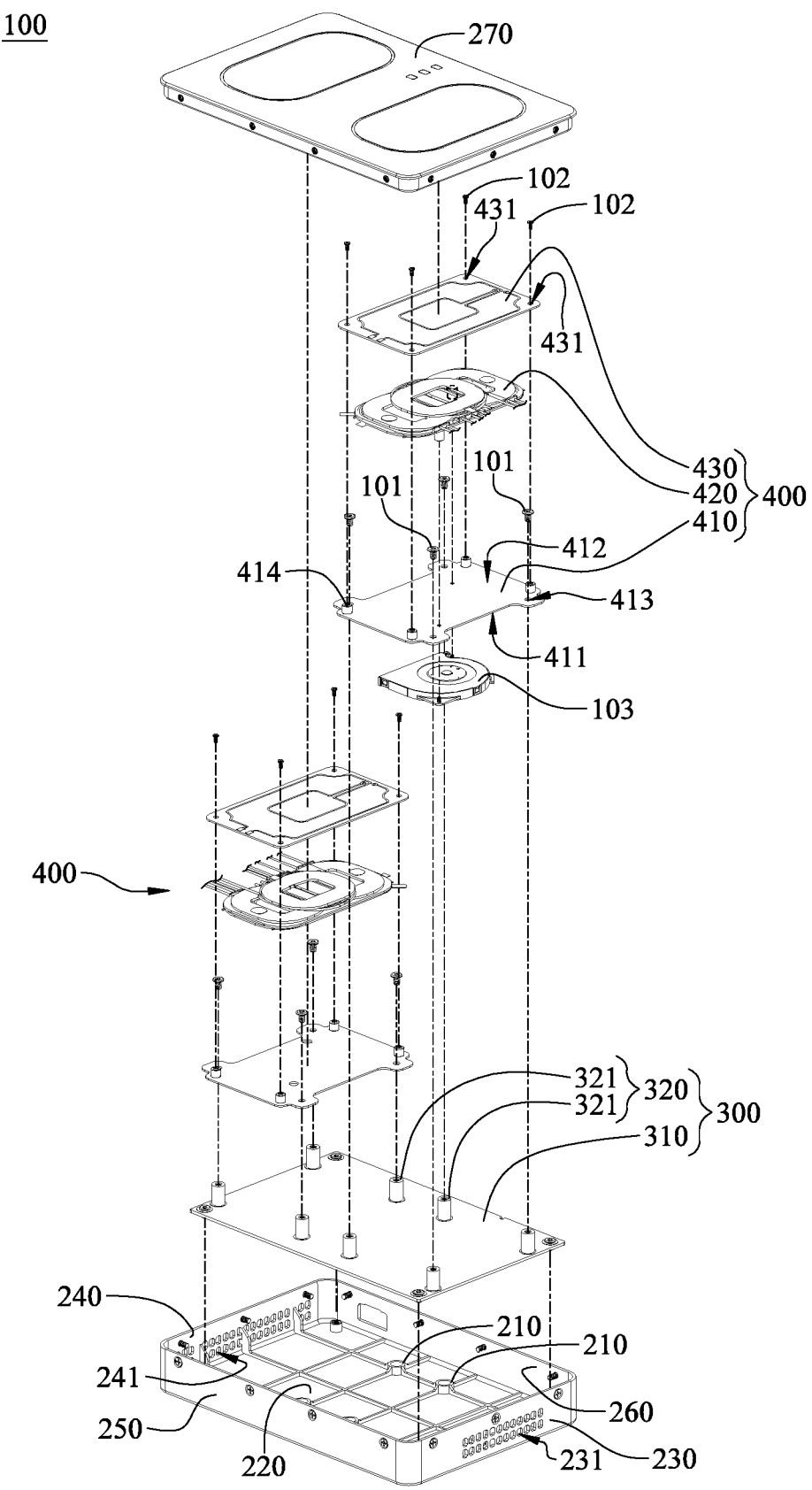
FIG. 2 is an exploded view of the wireless charging device in FIG. 1.
Figure 3:
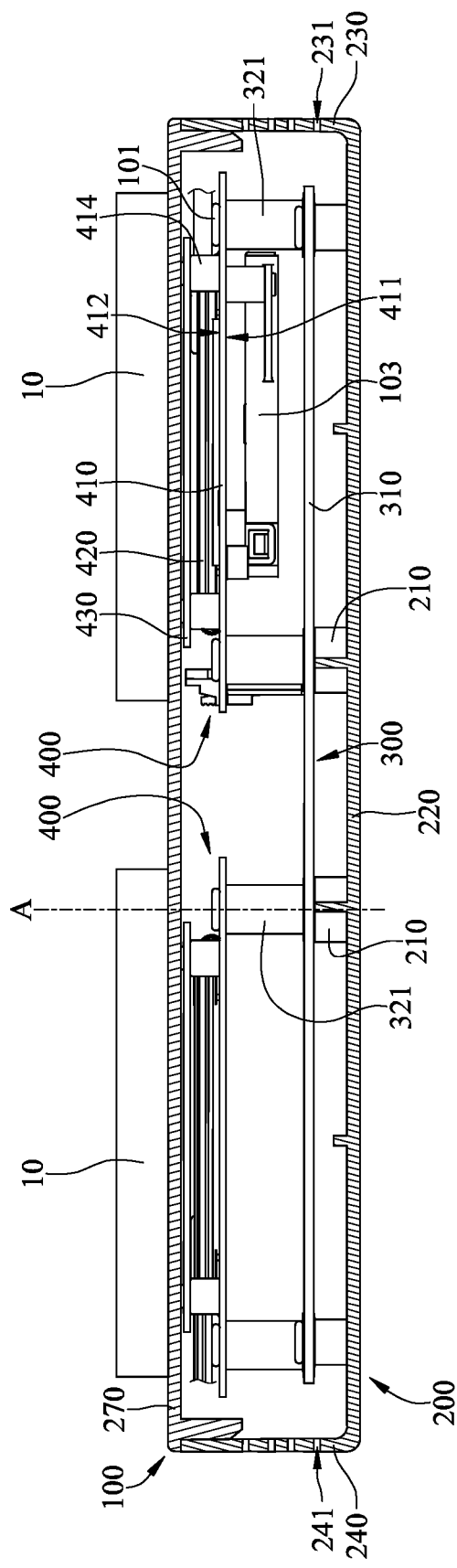
FIG. 3 is a cross-sectional view of the wireless charging device in FIG. 1 with mobile devices thereon.

Please refer to FIG. 1 to FIG. 3. FIG. 1 is a perspective view of a wireless charging device in accordance with the first embodiment of the invention, FIG. 2 is an exploded view of the wireless charging device in FIG. 1, and FIG. 3 is a cross-sectional view of the wireless charging device in FIG. 1 with mobile devices thereon.

In this embodiment, a wireless charging device 100 is provided. The wireless charging device 100 includes a casing 200, a circuit board 300 and two wireless charging modules 400. The wireless charging device 100 may further include a plurality of first fasteners 101, a plurality of second fasteners 102 and an airflow generator 103. The casing 200 includes a plurality of mounting pillars 210, a bottom plate 220, a first side plate 230, a second side plate 240, a third side plate 250, a fourth side plate 260 and a top plate 270. The plurality of mounting pillars 210 protrude from the bottom plate 220. The first side plate 230, the second side plate 240, the third side plate 250 and the fourth side plate 260 are respectively connected to a periphery of the bottom plate 220, the first side plate 230 and the second side plate 240 are respectively located on two opposite sides of the bottom plate 220, and the third side plate 250 and the fourth side plate 260 are respectively located on two opposite sides of the bottom plate 220. The first side plate 230 has at least one vent hole 231, and the second side plate 240 has at least one vent hole 241. The top plate 270 is connected to sides of the first side plate 230, the second side plate 240, the third side plate 250 and the fourth side plate 260 located farthest away from the bottom plate 220, and the top plate 270 is configured to carry a mobile device 10. The mobile device 10 is, for example, a smart phone or a tablet computer.

The circuit board 300 includes a substrate 310 and two support assemblies 320. The substrate 310 is stacked on the plurality of mounting pillars 210. Each of the support assemblies 320 includes a plurality of support pillars 321. The plurality of support pillars 321 protrude from the substrate 310. At least some of the support pillars 321 of the support assemblies 320 are respectively coaxially arranged with at least some of the mounting pillars 210 of the casing 200, such that the structural strength of the wireless charging device 100 can be enhanced by the coaxial arrangement of the support pillars 321 and the mounting pillars 210. Therefore, damages to the wireless charging device 100 caused by the deformation of the circuit board 300 can be prevented. Said coaxial arrangement of one support pillar 321 and one mounting pillar 210 means that an axis A of the support pillar 321 overlaps an axis A of the mounting pillar 210.

In this embodiment, at least some of the support pillars 321 are respectively coaxially arranged with at least some of the mounting pillars 210 of the casing 200, but the invention is not limited thereto. In other embodiments, the support pillars may be non-coaxially arranged with the mounting pillars, and projections of the support pillars on the bottom plate may at least partially overlap projections of the mounting pillars on the bottom plate. That is, the support pillars and the mounting pillars are, for example, disposed non-coaxially, and the axis of the support pillars does not overlap the axis of the mounting pillars.

Each of the wireless charging modules 400 includes a mounting frame 410, a charging coil 420 and a wireless communication antenna board 430. The mounting frame 410 is, for example, an aluminum sheet having a first surface 411, a second surface 412, a plurality of first assembling parts 413 and a plurality of second assembling parts 414. The first surface 411 faces the bottom plate 220 of the casing 200. The second surface 412 faces away from the first surface 411. The first assembling parts 413 are, for example, through holes extending from the first surface 411 to the second surface 412. The second assembling parts 414 are, for example, coupling nuts protruding from the second surface 412 of the mounting frame 410. The first fasteners 101 are respectively disposed through the first assembling parts 413 and respectively configured to be engaged with the support pillars 321 of the two support assemblies 320, so that the mounting frame 410 is fixed to the circuit board 300.

The charging coil 420 is stacked on the second surface 412 of the mounting frame 410. The wireless communication antenna board 430 has a plurality of through holes 431. The second fasteners 102 are, for example, screws, respectively disposed through the through holes 431 of the wireless communication antenna board 430 so as to be engaged with the second assembling parts 414, so that the wireless communication antenna board 430 is fixed to the second assembling parts 414 of the mounting frame 410. The charging coil 420 is located between the mounting frame 410 and the wireless communication antenna board 430 and spaced apart from the wireless communication antenna board 430 so as to reduce the interference between the charging coil 420 and the wireless communication antenna board 430.

The airflow generator 103 is, for example, a centrifugal fan disposed on the first surface 411 of the mounting frame 410 and configured to cool the circuit board 300, but the invention is not limited thereto. In other embodiments, the airflow generator may be an axial-flow fan disposed on the circuit board.

According to the wireless charging device as described above, since at least some of the support pillars of the support assembly are respectively coaxially arranged with at least some of the mounting pillars of the casing, or the projections of the support pillars on the bottom plate at least partially overlap the projections of the mounting pillars on the bottom plate, external forces exerted on the top plate can be transferred to the bottom plate via the second assembling parts, the mounting pillars and the support pillars, and thus, the force exerted on the circuit board can be reduced, thereby preventing damages to the wireless charging device caused by deformation of the circuit board.

In one embodiment of the invention, the wireless charging device according to the invention can be applied to vehicle devices, such as self-driving vehicles, electric vehicles and semi-self-driving vehicles.

It will be apparent to those skilled in the art that various modifications and variations can be made to the present invention. It is intended that the specification and examples be considered as exemplary embodiments only, with the scope of the invention being indicated by the following claims and their equivalents.

What is claimed is:

1. A wireless charging device comprising:
a casing comprising a bottom plate and a plurality of mounting pillars protruding from the bottom plate;
a circuit board comprising a substrate and at least one support assembly, wherein the substrate is stacked on the plurality of mounting pillars, the at least one support assembly comprises a plurality of support pillars protruding from the substrate; and
at least one wireless charging module comprising:
a mounting frame having a first surface, a second surface and a plurality of first assembling parts, the second surface facing away from the first surface, and the plurality of first assembling parts extending from the first surface to the second surface and respectively mounted on the plurality of support pillars; and
a charging coil disposed on the mounting frame;
wherein projections of the plurality of mounting pillars on the bottom plate at least partially overlap projections of the plurality of support pillars on the bottom plate;
wherein the wireless charging device further comprises an airflow generator disposed on the first surface of the mounting frame.

2. The wireless charging device according to claim 1, wherein at least some of the plurality of mounting pillars are respectively coaxially arranged with at least some of the plurality of support pillars.

3. The wireless charging device according to claim 1, wherein the mounting frame further has a plurality of second assembling parts, the at least one wireless charging module further comprises a wireless communication antenna board mounted on the plurality of second assembling parts, and the charging coil is located between the mounting frame and the wireless communication antenna board.

4. The wireless charging device according to claim 3, further comprising a plurality of first fasteners, wherein the plurality of second assembling parts protrude from the second surface, the plurality of first assembling parts are through holes extending from the first surface to the second surface, and the plurality of first fasteners are respectively disposed through the plurality of first assembling parts and configured to be engaged with the circuit board.

5. The wireless charging device according to claim 4, further comprising a plurality of second fasteners, wherein the plurality of second assembling parts are coupling nuts protruding from the second surface of the mounting frame, the wireless communication antenna board has a plurality of through holes, and the plurality of second fasteners are respectively disposed through the plurality of through holes of the wireless communication antenna board and respectively engaged with the plurality of second assembling parts.

6. The wireless charging device according to claim 3, wherein the charging coil is spaced apart from the wireless communication antenna board.

7. The wireless charging device according to claim 1, wherein a quantity of the at least one wireless charging module is two, a quantity of the at least one support assembly is two, and the plurality of first assembling parts of the two mounting frames of the two wireless charging modules are respectively mounted on the plurality of support pillars of the two support assemblies.

8. The wireless charging device according to claim 1, wherein the casing further comprises a first side plate and a second side plate, the first side plate and the second side plate are respectively connected to two opposite sides of the bottom plate, and the first side plate and the second side plate both have at least one vent holes.

9. The wireless charging device according to claim 8, wherein the casing further comprises a top plate, two opposite sides of the top plate are respectively connected to a side of the first side plate located farthest away from the bottom plate and a side of the second side plate located farthest away from the bottom plate, and the top plate is configured to carry a mobile device.

* * * * *